(12) United States Patent
Yamada et al.

(10) Patent No.: US 10,086,309 B2
(45) Date of Patent: Oct. 2, 2018

(54) FLIGHT DEVICE, FLIGHT METHOD THROWN BY USER AND STORAGE MEDIUM

(71) Applicant: CASIO COMPUTER CO., LTD., Shibuya-ku, Tokyo (JP)

(72) Inventors: Shunsuke Yamada, Tachikawa (JP); Takahiro Mizushina, Kawagoe (JP); Hideaki Matsuda, Tokyo (JP); Toshihiro Takahashi, Kunitachi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/278,791

(22) Filed: Sep. 28, 2016

(65) Prior Publication Data
US 2017/0144078 A1 May 25, 2017

(30) Foreign Application Priority Data

Nov. 25, 2015 (JP) .................................. 2015-230120
Jun. 23, 2016 (JP) .................................. 2016-124921

(51) Int. Cl.
*A63H 27/00* (2006.01)
*B64C 39/02* (2006.01)
(Continued)

(52) U.S. Cl.
CPC ............. *A63H 27/12* (2013.01); *A63H 29/24* (2013.01); *B64C 39/024* (2013.01);
(Continued)

(58) Field of Classification Search
CPC .......... B64C 2201/08; B64C 2201/088; B64C 17/00; B64C 19/00; B64C 2201/127; B64C 2201/182; B64C 39/024; A63H 7/12; A63H 29/24; G03B 15/006; B64D 3/06; B64D 47/08; G05D 1/0061
See application file for complete search history.

(56) References Cited

U.S. PATENT DOCUMENTS 9,289,685 B2 * 3/2016 Moore .................... A63F 13/12
9,308,425 B2 * 4/2016 Choi ......................... F42B 6/00
(Continued)

FOREIGN PATENT DOCUMENTS

JP 2013129301 A 7/2013
JP 5432277 B2 3/2014
(Continued)

OTHER PUBLICATIONS

Brockers, Roland et al., "Towards autonomous navigation of miniature UAV", 2014 IEEE Conference on Computer Vision and Pattern Recognition Workshops, pp. 645-651 (Year: 2014).*
(Continued)

*Primary Examiner* — Behrang Badii
*Assistant Examiner* — David A Testardi
(74) *Attorney, Agent, or Firm* — Holtz, Holtz & Volek PC

(57) ABSTRACT

A flight device includes at least one propelling unit and a controller unit for flying in the air, and the flight device is thrown by a user. The controller unit drives the propelling unit after throwing is performed by the user, such that the flight device flies based on a state of the flight device at a moment when the throwing is performed.

12 Claims, 8 Drawing Sheets

(51) Int. Cl.
*A63H 29/24* (2006.01)
*G03B 15/00* (2006.01)

(52) U.S. Cl.
CPC ........ *G03B 15/006* (2013.01); *B64C 2201/08* (2013.01); *B64C 2201/088* (2013.01); *B64C 2201/127* (2013.01)

(56) References Cited

U.S. PATENT DOCUMENTS

| | | | |
|---|---|---|---|
| 9,477,229 B1* | 10/2016 | Lee | G05D 1/042 |
| 9,675,882 B2* | 6/2017 | Hall | A63F 13/10 |
| 2006/0249623 A1* | 11/2006 | Steele | B64F 1/02 |
| | | | 244/116 |
| 2007/0178967 A1* | 8/2007 | Rosenberg | A63B 24/0087 |
| | | | 463/39 |
| 2009/0017799 A1* | 1/2009 | Thorn | G06F 3/017 |
| | | | 455/414.1 |
| 2011/0081923 A1* | 4/2011 | Forutanpour | G06F 1/1694 |
| | | | 455/457 |
| 2011/0147515 A1* | 6/2011 | Miller | B64C 39/028 |
| | | | 244/63 |
| 2011/0288696 A1 | 11/2011 | Lefebure | |
| 2015/0370250 A1* | 12/2015 | Bachrach | G05D 1/0016 |
| | | | 701/2 |
| 2016/0062364 A1* | 3/2016 | Foinet | A63H 27/14 |
| | | | 701/2 |
| 2016/0101856 A1* | 4/2016 | Kohstall | G05D 1/101 |
| | | | 244/17.13 |
| 2016/0139602 A1* | 5/2016 | Kohstall | G05D 1/101 |
| | | | 701/3 |
| 2016/0179096 A1* | 6/2016 | Bradlow | B64C 19/00 |
| | | | 701/8 |
| 2016/0313742 A1* | 10/2016 | Wang | G05D 1/0669 |
| 2017/0197731 A1* | 7/2017 | Yang | B64F 1/04 |
| 2017/0220046 A1* | 8/2017 | Tsai | G05D 1/0274 |

FOREIGN PATENT DOCUMENTS

| | | | |
|---|---|---|---|
| WO | WO-2013/055265 A1 * | 4/2013 | |
| WO | 2015085598 A1 | 6/2015 | |

OTHER PUBLICATIONS van der Marel, Hans, Surveying and Mapping Lecture Notes CTB3310 ("Reference Systems for Surveying and Mapping"), Chapters 2 through 4, Published by Delft University of Technology, Aug. 2014, pp. 3-24 (Year: 2014).*

Weiss, Stephan, "Inertial optical flow for throw-and-go micro air vehicles", 2015 IEEE Winter Conference on Applications of Computer Vision, pp. 262-269 (Year: 2015).*

Japanese Office Action (and English translation thereof) dated May 30, 2017 issued in counterpart Japanese Application No. 2016-124921.

Japanese Office Action (and English translation thereof) dated Dec. 20, 2016, issued in counterpart Japanese Application No. 2016-124921.

* cited by examiner

FLIGHT DEVICE, FLIGHT METHOD THROWN BY USER AND STORAGE MEDIUM

CROSS-REFERENCE TO RELATED APPLICATION

This application is based upon and claims the benefit of priority under 35 USC 119 of Japanese Patent Application Nos. 2015-230120 filed on Nov. 25, 2015, and 2016-124921 filed on Jun. 23, 2016, the entire disclosure of which, including the description, claims, drawings, and abstract, is incorporated herein by reference in its entirety.

BACKGROUND OF THE INVENTION

1. Field of the Invention

The present invention relates to a flight device which flies without a pilot if it is thrown from a thrower's hand or the like.

2. Description of the Related Art

Flight devices configured by attaching digital cameras to small pilotless flight devices referred to collectively as so-called drones have started to spread (see JP-B-5432277 and JP-A-2013-129301 for instance). The small pilotless flight devices each have, for example, four propelling devices using rotor blades configured to be driven by motors, and the flight devices and the digital cameras are operated by timers or are remotely operated in various manners such as a wireless manner, thereby performing imaging from high positions beyond people's reach.

SUMMARY OF THE INVENTION

According to one aspect of the present invention, a flight device includes at least one propelling unit and a controller unit for flying in the air and the flight device is thrown by a user. The controller unit drives the propelling unit after throwing is performed by the user, such that the flight device flies based on a state of the flight device at a moment when the throwing is performed.

According to another aspect of the present invention, a flight method of a flight device which has at least one propelling unit for flying in the air and which is thrown by a user, including: driving the propelling unit after throwing is performed by the user, such that the flight device flies based on a state of the flight device at a moment when the throwing is performed.

According to further another aspect of the present invention, a non-transitory computer readable storage medium causes a flight device which has at least one propelling unit for flying in the air and which is thrown by a user, to perform: driving the propelling unit after throwing is performed by the user, such that the flight device flies based on a state of the flight device at a moment when the throwing is performed.

DETAILED DESCRIPTION OF THE PREFERRED EMBODIMENTS

Hereinafter, embodiments of the present invention will be described in detail with reference to the accompanying drawings. In the embodiments of the present invention, after a thrower (a user) throws a flight device, propelling units of the flight device are driven such that the flight device flies based on the state of the flight device at the moment of throwing. In this way, the flight device can be controlled. According to a first embodiment for implementing such control, after a thrower throws the flight device, a trajectory at the moment of throwing is calculated, and the propelling units of the flight device are driven such that the flight device flies along the calculated trajectory. In this way, the direction of flight and the flight distance after throwing of the flight device can be controlled. Also, according to a second embodiment, after a thrower throws the flight device, a destination point is estimated based on the state of the flight device at the moment of throwing, and the propelling units of the flight device are driven such that the flight device flies to the estimated destination point. In this way, the destination point of the flight device can be controlled. More specifically, based on an output of an acceleration sensor at the moment when the flight device was separated from the body (hand) of the thrower by throwing, the velocity of the flight device is calculated and based on the calculated velocity value, the initial velocity, the horizontal angle, and the elevation angle at the moment of throwing are calculated. As a result, the trajectory parabola at the moment of throwing is determined, and motors for rotating rotor blades are controlled such that the flight device autonomously flies away along the trajectory. Therefore, when throwing the flight device upward, the thrower can sensuously control the flight device, such that the flight device flies away. In other words, if the thrower wants to throw the flight device to some place, the thrower can sensuously image the throwing force and the throw angle required to achieve the purpose of the thrower. As the throwing force increases, the highest point which the flight device reaches gets higher. If the flight device reaches the highest point, it is possible to control the flight device such that the flight device hovers and performs imaging with the camera.

Figure 1:
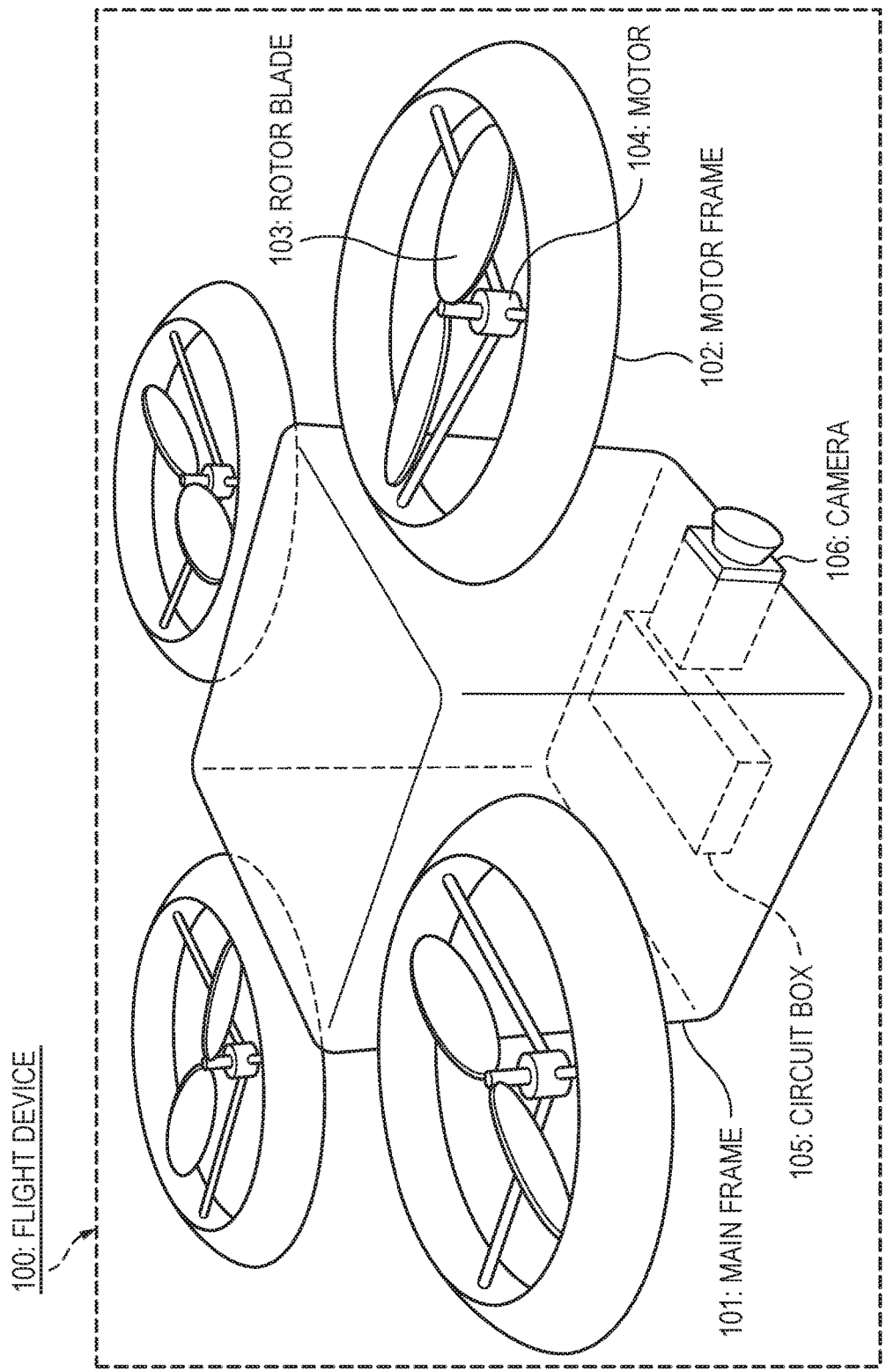
FIG. 1 is a view illustrating an example of the structure of motor frames of a flight device according to embodiments.

FIG. 1 is a view illustrating an example of the external appearance of a flight device 100 common to the first and second embodiments of the present invention.

Four circular motor frames (supporting units) 102 are attached to a main frame 101. The motor frames 102 are configured to be able to support motors 104, and rotor blades 103 are fixed on the motor shafts of the motors 104. The four pairs of motors 104 and rotor blades 103 constitute propelling units.

The main frame 101 contains a circuit box 105, which contains motor drivers for driving the motors 104, a controller, various sensors, and so on. On the lower portion of the main frame 101, a camera 106 which is an imaging device is attached.

Figure 2:
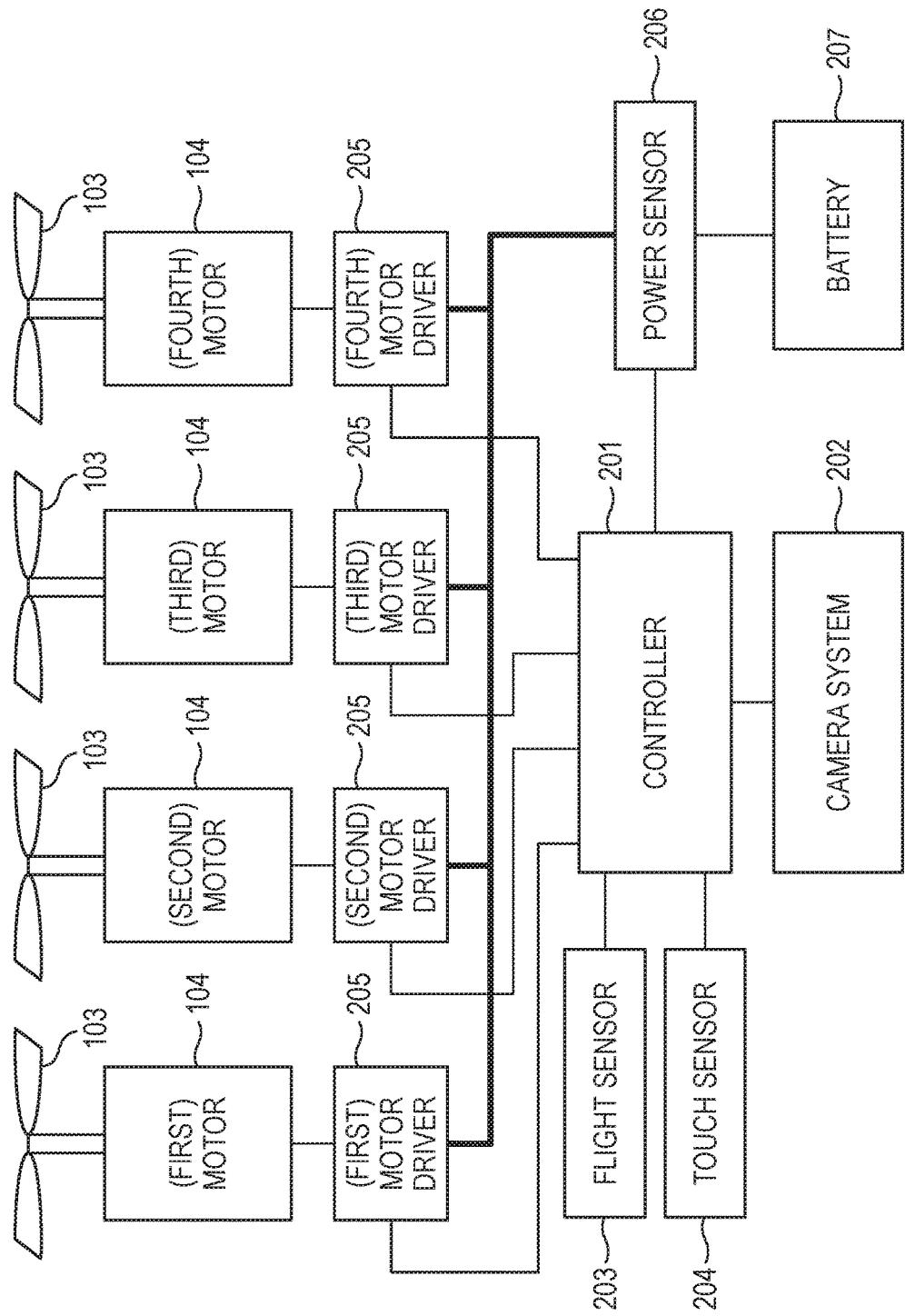
FIG. 2 is a view illustrating an example of the system configuration of the flight device according to the embodiments.

FIG. 2 is a view illustrating an example of the system configuration of the flight device 100 of the embodiments having the structure shown in FIG. 1. A controller 201 is connected to a camera system 202 including the camera 106 (see FIG. 1), a flight sensor 203 composed of various components such as acceleration sensors, a gyroscope, a GPS (global position system) sensor, and a pressure sensor, touch sensors 204 (touch detection sensor units), first to fourth motor drivers 205 for driving the first to fourth motors 104 (see FIG. 1), respectively, and a power sensor 206 for supplying electric power to the individual motor drivers 205 while monitoring the voltage of a battery 207. Here, the touch sensors 204 may be push buttons or the like as long as they can detect touches. Also, although not particularly shown, electric power of the battery 207 is also supplied to various control units for the controller 201, the camera system 202, the flight sensor 203, the touch sensors 204, the motor drivers 205, and the power sensor 206. The controller 201 acquires information on the posture of the airframe of the flight device 100 from the flight sensor 203 in real time. Also, the controller 201 uses the power sensor 206 to transmit power instruction signals to the first to fourth motor drivers 205 while monitoring the voltage of the battery 207. The power instruction signals depend on duty ratios based on pulse width modulation of the first to fourth motor drivers, respectively. As a result, the first to fourth motor drivers 205 control the rotation speeds of the first to fourth motors 104, respectively. Also, the controller 201 controls the camera system 202, thereby controlling an imaging operation of the camera 106 (FIG. 1).

The controller 201, the camera system 202, the flight sensor 203, the motor drivers 205, the power sensor 206, and the battery 207 shown in FIG. 2 are stored in the circuit box 105 contained in the main frame 101 of FIG. 1. Also, although not shown in FIG. 1, the touch sensors 204 are stuck on the main frame 101 and/or the motor frames 102 shown in FIG. 1, and detect the difference in the electrical physical quantity between when the main frame 101 or the motor frames 102 are being touched by thrower's fingers or the like and when the main frame and the motor frames are not being touched.

Figure 3A:
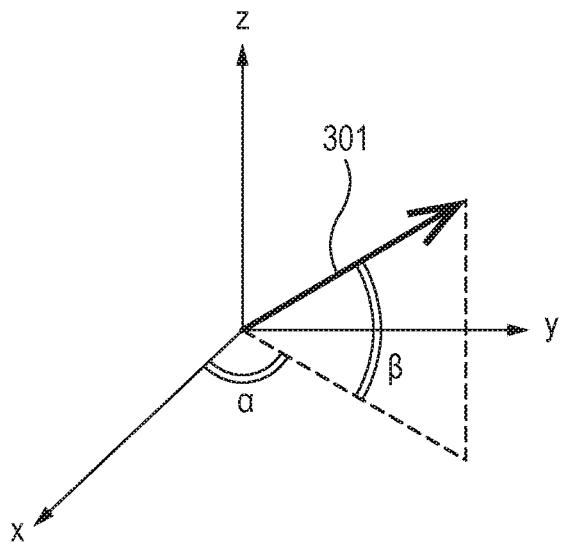
FIG. 3A is an explanatory view of an operation of a first embodiment.
Figure 3B:
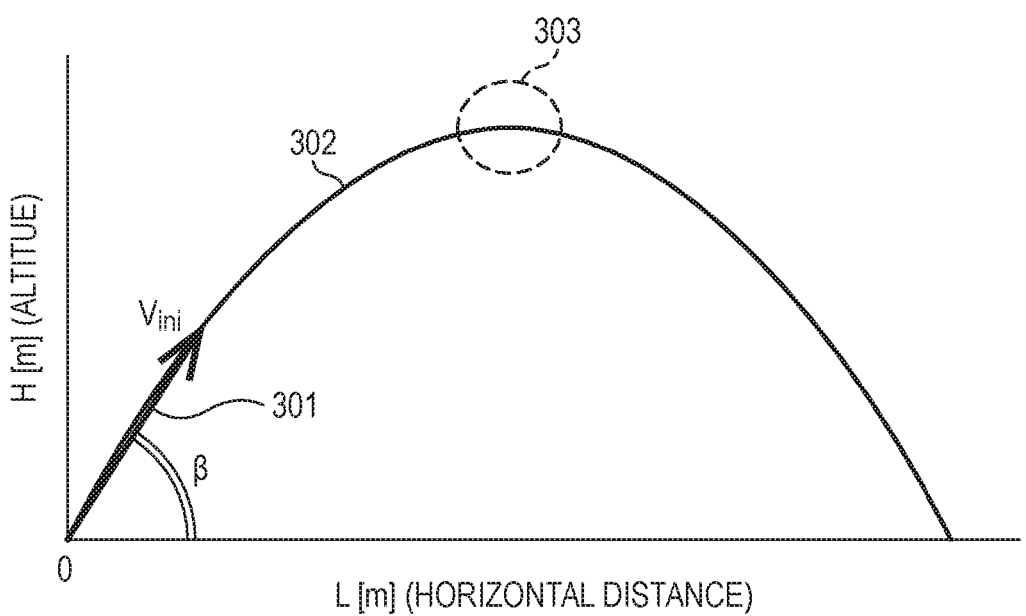
FIG. 3B is another explanatory view of the operation of the first embodiment.

Hereinafter, operations of the flight device 100 having the above described configuration will be described. FIGS. 3A and 3B are explanatory views of the operation of the first embodiment. In the first embodiment, if a thrower throws the flight device 100, the controller 201 of FIG. 2 first operates as a trajectory calculating unit for calculating the trajectory at the moment of throwing. First, the controller 201 calculates the velocities Vx, Vy, and Vz of the directions of the individual coordinate axes of a predetermined absolute coordinate system at the moment of throwing. At this time, the controller 201 calculates the velocities Vx, Vy, and Vz, based on the acceleration values of the directions of the coordinate axes output from the flight sensor 203 of FIG. 2 at the moment of throwing. Here, if it is assumed that the acceleration values of the directions of the x axis, the y axis, and the z axis of the predetermined absolute coordinate system output from the flight sensor 203 is ax (m/s²), ay (m[/s²), and az (m/s²), respectively, and the throwing start time when any one of those acceleration values exceeded a predetermined threshold is ts, and the release time when it was detected based on the outputs of the touch sensors 204 of FIG. 2 that the flight device 100 was separated from the body of the thrower is tr, the controller 201 separately integrates the acceleration values ax, ay, and az from the throwing start time ts to the release time tr as shown by the following Expressions 1, 2, and 3, thereby calculating the velocities Vx, Vy, and Vz of the directions of the individual coordinate axes at the moment of throwing.

$$V_x = \int_{t_s}^{t_r} a_x \Delta t \quad \text{[Expression 1]}$$

$$V_y = \int_{t_s}^{t_r} a_y \Delta t \quad \text{[Expression 2]}$$

$$V_z = \int_{t_s}^{t_r} a_z \Delta t \quad \text{[Expression 3]}$$

Subsequently, based on the velocities Vx, Vy, and Vz of the directions of the individual coordinate axes, the controller 201 calculates a flight direction vector 301 starting from the origin of the x axis, the y axis, and the z axis, as shown in FIG. 3A. Specifically, the controller 201 first calculates the initial velocity Vini (m/s) at the moment of throwing, as the magnitude of the vector 301, by performing an operation shown by the following Expression 4.

$$V_{ini} = \sqrt{V_x^2 + V_y^2 + V_z^2} \quad \text{[Expression 4]}$$

Further, the controller 201 calculates the horizontal angle α and vertical angle β of the flight direction vector 301 starting from the origin by operations corresponding to the following Expressions 5 and 6. When it is assumed that the x axis and the y axis of FIG. 3A are parallel to the ground, and the z axis is perpendicular to the ground, the horizontal angle α and the vertical angle β mean the angle in a rotation direction from the x axis toward the y axis in a coordinate plane parallel to the ground, and the angle in a rotation direction from the x axis toward the z axis in a coordinate plane perpendicular to the ground, respectively.

$$\alpha = \tan^{-1}\left(\frac{V_z}{\sqrt{V_x^2 + V_y^2}}\right) \quad \text{[Expression 5]}$$

$$\beta = \tan^{-1}\left(\frac{V_y}{V_x}\right) \quad \text{[Expression 6]}$$

Therefore, in a case where the flight device 100 is thrown at the initial velocity Vini, the horizontal angle α, and the vertical angle β, an ideal trajectory which is traced by the flight device becomes as shown by a parabola 302 in FIG. 3B, and the flight altitude H (m) and the horizontal flight distance L (m) from the location at the release time tr become as shown by the following Expressions 7 and 8. In Expressions 7 and 8, t (sec) is the elapsed time from the release time tr, and g (m/s²) is the acceleration of gravity, and K is a throwing correction coefficient. If the thrower is week or wants to throw the flight device far, the thrower can adjust the value of K, for example, by operating a switch (not particularly shown) of the main body of the flight device 100.

$$H = V_{ini} \times K \times \sin\beta \times t - \frac{1}{2} \times g \times t^2 \quad \text{[Expression 7]}$$

$$L = V_{ini} \times K \times \cos\beta \times t \quad \text{[Expression 8]}$$

The controller 201 controls the first to fourth motor drivers 205 of FIG. 2 such that, at the elapsed time t from the release time tr, the flight device is positioned at the altitude H (m) calculated by Expression 7 and the horizontal distance L (m) calculated by Expression 8 in the direction of the horizontal angle α from the location at the release time tr.

Also, if the flight device reaches the highest altitude corresponding to the highest point of the parabola 302 of FIG. 3B, and the altitude H (m) of the flight device starts to decrease, the controller 201 controls the first to fourth motor drivers 205 such that the flight device hovers, and controls the camera system 202 such that imaging of the camera 106 of FIG. 1 starts.

Figure 4:
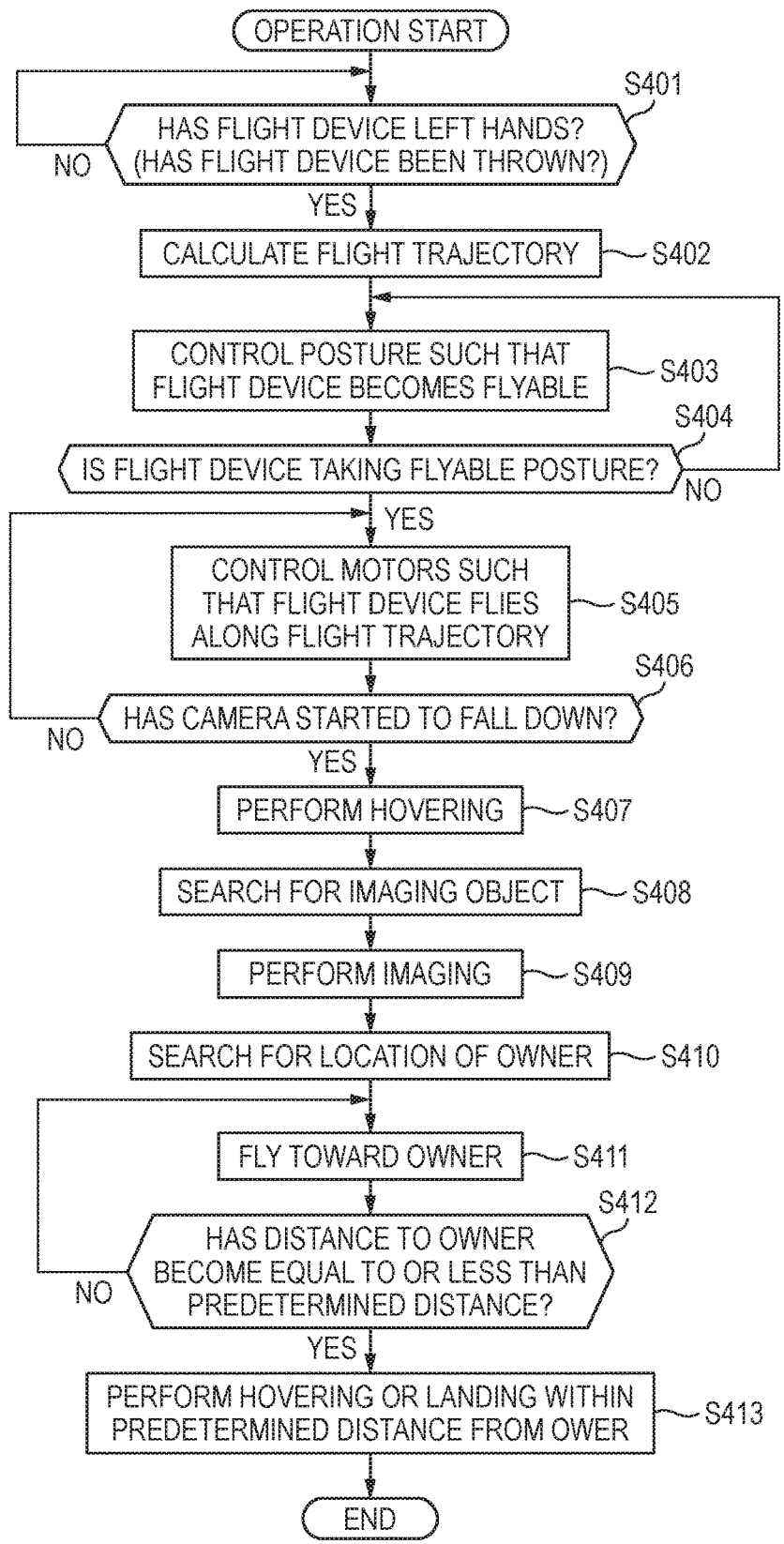
FIG. 4 is a flow chart illustrating an example of a flight device control process according to the first embodiment.

FIG. 4 is a flow chart illustrating an example of a control process of the flight device 100 according to the first embodiment. This process can be implemented in the controller 201 of FIG. 2 as a process in which a central processing unit (CPU) included in the controller executes a control program stored in a memory (not particularly shown) included in the controller.

First, in STEP S401, the controller 201 monitors whether the flight device 100 have been separated from a hand of a user (whether the flight device has been thrown), for example, by monitoring variations in the voltages of the touch sensors 204. If the determination result of STEP 401 is "NO", the controller repeats STEP S401.

If the determination result of STEP S401 becomes "YES", in STEP S402, the controller 201 calculates the flight trajectory by Expressions 1 to 8 described above.

Subsequently, in STEP S403, the controller 201 performs a posture control operation such that the flight device becomes flyable. Then, in STEP S404, based on the output of the flight sensor 203, the controller determines whether the flight device is taking a flyable posture. If the determination result of STEP S404 is "NO", the controller repeats STEP S403.

If the determination result of STEP S404 becomes "YES", in STEP S405, the controller 201 controls the first to fourth motor drivers 205 of FIG. 2 such that, at the elapsed time t, the flight device is positioned at the altitude H (m) calculated by Expression 7 and the horizontal distance L (m) calculated by Expression 8 in the direction of the horizontal angle α.

Subsequently, in STEP S406, the controller 201 monitors whether the airframe of the flight device 100 has transitioned from a rising state to a falling state, by determining whether the altitude H (m) has started to decrease, or by monitoring variations in the acceleration values of three directions of the x axis, the y axis, and the z axis output from the flight sensor 203. If the determination result of STEP S406 is "NO", the controller 201 returns to the process of STEP S405, and repeatedly performs the process of STEP S405 for performing control such that the flight device traces the trajectory, and the process of STEP S406 for performing falling-state determination.

If the determination result of STEP S406 becomes "YES", in STEP S407, the controller 201 controls the first to fourth motor drivers 205, thereby maintaining the airframe of the flight device 100 in the hovering state.

Subsequently, in STEP S408, the controller 201 searches for an imaging object. As the searching method, it is possible to use an existing technology. As an example, the controller 201 may compare GPS data (latitude/longitude data) and air pressure data (altitude data) which the flight device 100 has received from a communication device held by the user who threw up the flight device, with GPS data and air pressure data of the airframe output from the flight sensor 203, thereby calculating the positional relation between the airframe and the user, and control the camera system 202, thereby turning the camera 106 toward the user. As another example, the controller 201 may control the camera system 202, thereby imaging the ground side by the camera 106. In this case, if somebody is detected, the controller locks the camera 106 in that direction. As a further example, the controller 201 may control the camera system 202, thereby turning the camera 106 in a random direction toward the ground side.

If some imaging object is found, in STEP S409, the controller 201 controls the camera 106 through the camera system 202, such that the camera performs imaging, thereby obtaining image data. The controller 201 may store the image data in the internal memory of the controller 201. Alternatively, the controller 201 may transmit the image data to the terminal device of the user who threw up the flight device, by wireless communication.

If imaging is performed for a predetermined period or a predetermined number of times, or imaging finishes in response to an instruction from the user, in STEP S410, the controller 201 searches for the location of the user (the owner) who threw up the flight device. As this searching method, similarly in the case of STEP S408, it is possible to use an existing technology.

If the location of the owner is found, in STEP S411, the controller 201 controls the first to fourth motor drivers 205 such that the flight device flies toward the owner. Then, in STEP S412, based on GPS data and the like, the controller determines whether the distance from the owner is equal to or less than a predetermined distance. If the determination result of STEP S412 is "NO", the controller repeats STEP S411.

If the determination result of STEP S412 becomes "YES", in STEP S413, the controller 201 controls the first to fourth motor drivers 205 such that the motor drivers perform a hovering operation or an operation of landing on the hands of the thrower within the predetermined distance from the owner. In a case where a landing operation is performed, the controller stops the first to fourth motors, and finishes the control operation.

Figure 5A:
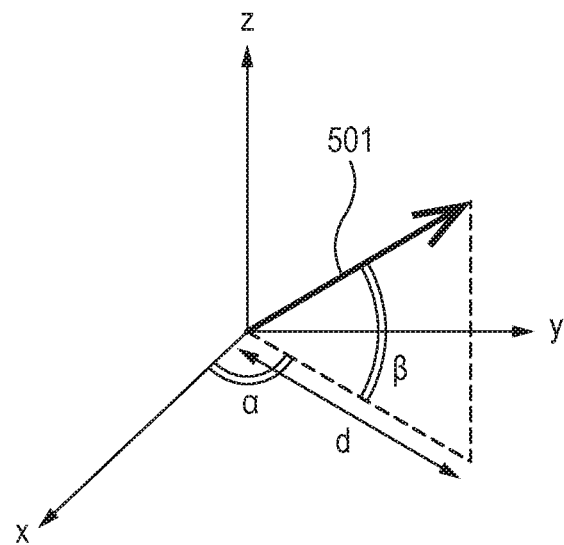
FIG. 5A is an explanatory view of an operation of a second embodiment.
Figure 5B:
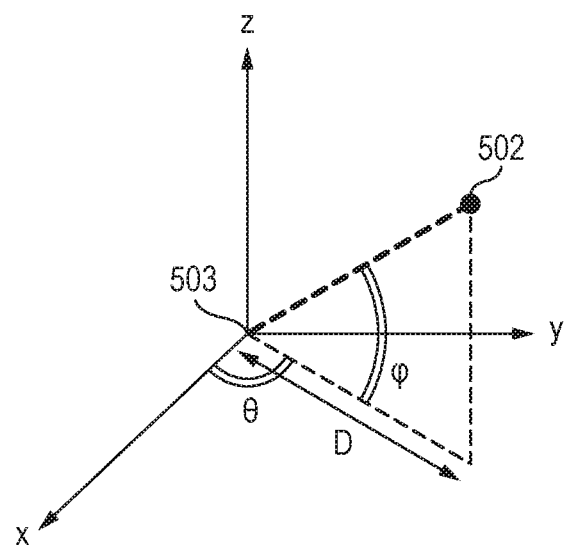
FIG. 5B is another explanatory view of the operation of the second embodiment.

FIGS. 5A and 5B are explanatory views of the operation of the second embodiment. In the second embodiment, if the thrower throws the flight device, the controller 201 of FIG. 2 first operates as an estimating unit for estimating a destination point based on the state of the flight device at the moment of throwing. Similarly in the first embodiment, first, the controller 201 calculates the velocities Vx, Vy, and Vz of the directions of the x axis, the y axis, and the z axis at the moment of throwing, based on operations corresponding to Expressions 1 to 3 described above.

Subsequently, based on the velocities Vx, Vy, and Vz of the directions of the individual coordinate axes, the controller 201 calculates a flight direction vector 501 starting from the origin of the x axis, the y axis, and the z axis, as shown in FIG. 5A. Specifically, similarly in the first embodiment, first, with respect to the flight direction vector 501 from the origin, the controller 201 first calculates the horizontal angle α in the rotation direction from the x axis toward the y axis, and the vertical angle β in the rotation direction from the x axis toward the z axis, based on operations corresponding to Expressions 5 and 6 described above.

Subsequently, the controller 201 calculates the initial velocity Vini (m/s) on a plane parallel to the ground at the moment of throwing, by performing an operation shown by the following Expression 9.

$$V_{ini} = \sqrt{V_x^2 + V_y^2} \qquad \text{[Expression 9]}$$

Further, the controller 201 calculates a horizontal distance "d" (m) which can be estimated based on the state at the moment of throwing (hereinafter, this distance will be referred to as the "estimated horizontal throw"), by performing an operation shown by the following Expression 10 wherein "h" is an appropriate coefficient.

$$d = h \times V_{ini} \qquad \text{[Expression 10]}$$

The estimated horizontal throw "d" corresponds to the length of a vector obtained by mapping the flight direction vector 501 starting from the origin onto the x-y coordinate plane parallel to the ground as shown in FIG. 5A.

Meanwhile, the controller 201 has information on flight destination locations 502 of the flight device 100 shown in FIG. 5B. For example, with respect to imaging spots in a place (such as a tourist attraction), the controller may have latitude/longitude information and altitude information of imaging locations where it is possible to cleanly image subjects in the imaging spots, as the flight destination location information. Based on the outputs of the GPS sensor and the pressure sensor included in the flight sensor 203 of FIG. 2 at the release time when the flight device was separated from the body of the thrower, the controller 201 calculates the latitude, the longitude, and the altitude at the release time, as an initial location 503 shown in FIG. 5B. Subsequently, with respect to each of the plurality of destination locations, based on the latitude, longitude, and altitude of the corresponding destination location 502, and the latitude, longitude, and altitude of the initial location 503, the controller 201 calculates the horizontal angle θ between the initial location 503 and the destination location 502, the vertical angle φ between the initial location 503 and the destination location 502, and the horizontal movement distance "D" from the initial location 503 to the destination location 502. Then, the controller 201 generates a destination location table, which contains the plurality of destination locations, and destination location information items having the horizontal angles θ, vertical angles φ, and horizontal movement distances "D" calculated with respect to the destination locations, as parameters, in association with each other.

Subsequently, the controller 201 compares the horizontal angle α, the vertical angle β, and the estimated horizontal throw "d" of FIG. 5A calculated with respect to the moment of throwing by the operations corresponding to Expressions 5, 6, 9, and 10, with the horizontal angles θ, the vertical angles 9, and the horizontal movement distances "D" corresponding to the plurality of destination location information items contained in the destination location table, and selects a destination location information item closest to the horizontal angle α, the vertical angle β, and the estimated horizontal throw "d" calculated with respect to the moment of throwing, as the destination point, from the plurality of destination location information items.

Specifically, when the ratio of the circumference to the diameter of a circle is represented by π, and a horizontal angle, a vertical angle, and a horizontal movement distance corresponding to the i-th destination location information item of the destination location table are represented by θi, φi, and Di, respectively, and weighting coefficients for the horizontal angle, the vertical angle, and the horizontal movement distance are represented by "a", "b", and "c", respectively, and the maximum distance to which flight in the horizontal direction is possible is represented by Dmax, the controller 201 calculates an error "E" between the horizontal angle α, the vertical angle β, and the estimated horizontal throw "d", and the horizontal angle θi, the vertical angle φi, and the horizontal movement distance "Di" corresponding to the i-th destination location information item by an operation equivalent to the following Expression 11.

$$E = \sqrt{a\left(\frac{\alpha - \theta_i}{2\pi}\right)^2 + b\left(\frac{\beta - \varphi_i}{\pi}\right)^2 + c\left(\frac{d - D_i}{D_{max}}\right)^2} \qquad \text{[Expression 11]}$$

The controller 201 calculates errors "E" with respect to the plurality of destination location information items contained in the destination location table, and selects a destination location information item having the minimum error "E", as the destination point. Then, the controller 201 controls the first to fourth motor drivers 205 of FIG. 2 such that the flight device flies at the horizontal angle θ and the vertical angle φ by the horizontal distance "D" according to the selected destination location information item.

In this way, in the second embodiment, if the thrower throws the flight device 100 in a direction guessed as the direction of a subject, a predetermined optimal destination location is automatically selected, whereby the flight device 100 can fly to the selected destination location and perform imaging. Therefore, even beginners can easily perform imaging with the flight device 100.

By the way, throwers are different in the power (capability) to throw the flight device 100. For this reason, in the second embodiment, for example, if a thrower powerfully throws the flight device at a trial in advance, the controller 201 may measure the horizontal angle, the vertical angle, and the initial velocity at the moment of trial throwing, based on the relative relation with a point to which the flight device is thrown by predetermined maximum power, thereby determining the coefficient "h" of Expression 10, and the weighting coefficients "a", "b", and "c" of Expression 11 for the horizontal angle, the vertical angle, and the horizontal movement distance. This corresponds to a process of estimating the propulsion of each of the motors 104 corresponding to the state at the moment when the flight device was thrown by the thrower. If the flight device is thrown, each motor driver 205 is driven to make estimated propulsion.

Figure 6A:
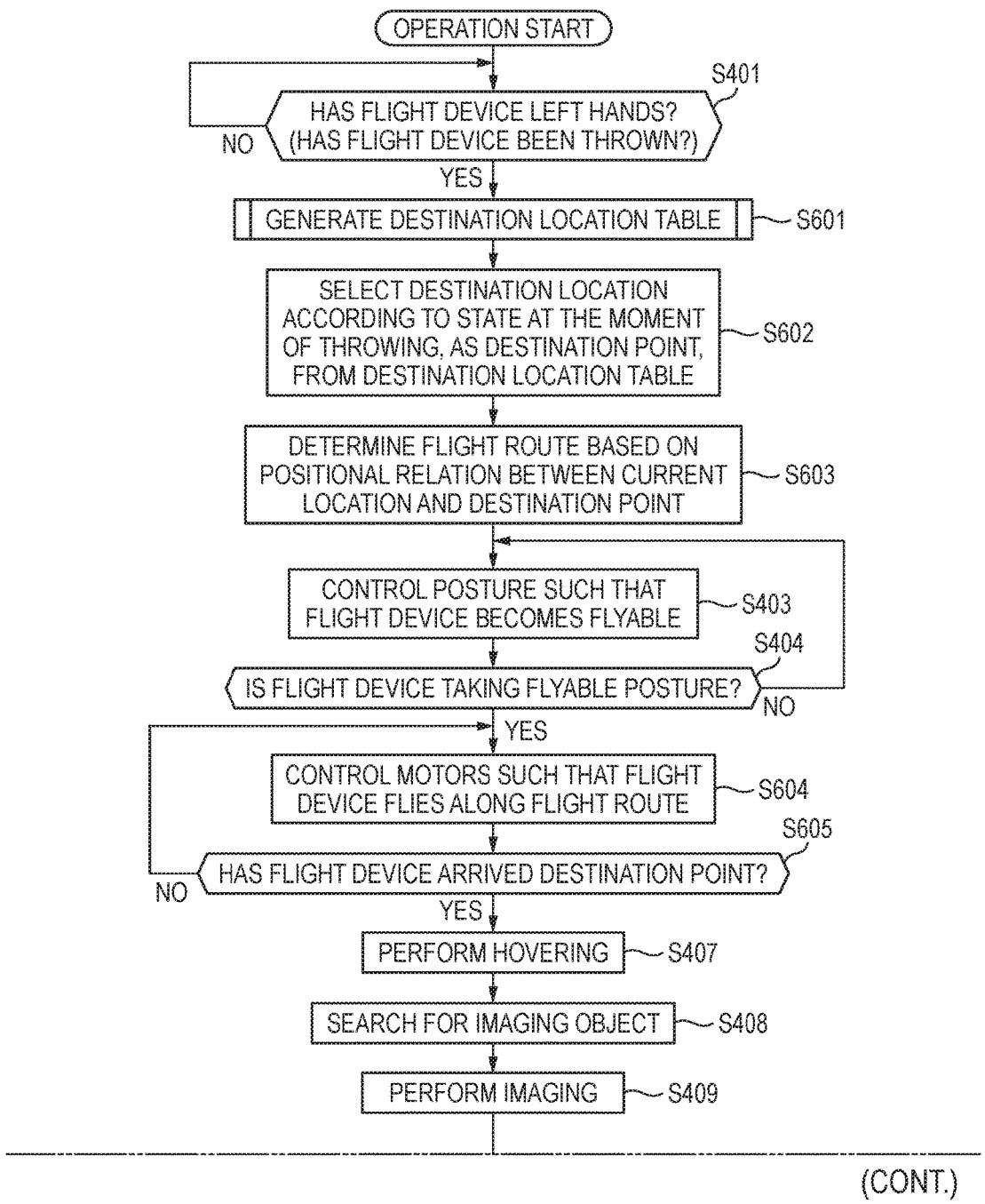
FIGS. 6A and 6B show a flow chart illustrating an example of a flight device control process according to the second embodiment.
Figure 6B:
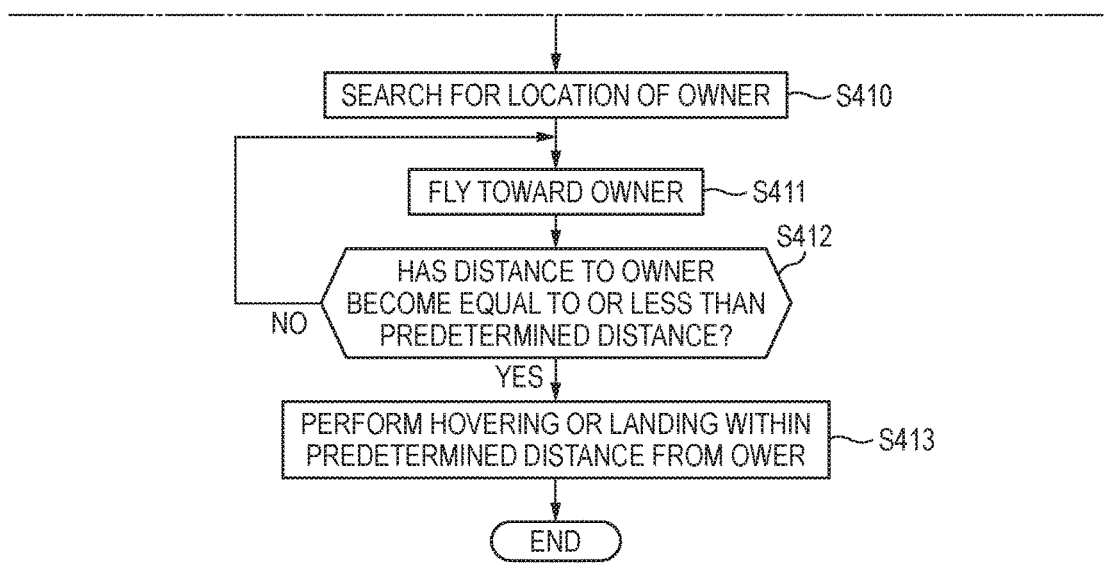

FIGS. 6A and 6B show a flow chart illustrating an example of a control process of the flight device 100 according to the second embodiment. Similarly in the first embodiment of FIG. 4, this process can be implemented in the controller 201 of FIG. 2 as a process in which the CPU included in the controller executes a control program stored in a memory (not particularly shown) included in the controller. In the flow chart of FIGS. 6A and 6B, processes denoted by the same step numbers as those of FIG. 4 are processes identical to those of the flow chart of FIG. 4 according to the first embodiment.

First, in STEP S401 of FIG. 6A, similarly in STEP S401 of FIG. 4, the controller 201 monitors whether the flight device 100 have been separated from a hand of a user (whether the flight device has been thrown), for example, by monitoring variations in the voltages of the touch sensors 204. If the determination result of STEP 401 is "NO", the controller repeats STEP S401.

Figure 7:
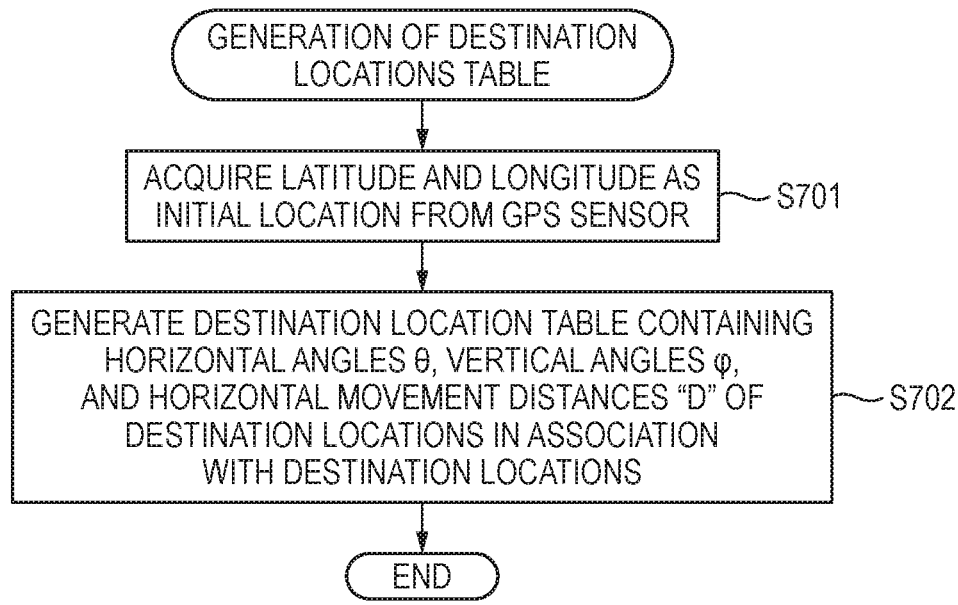
FIG. 7 is a flow chart illustrating a detailed example of a destination location table generating process according to the second embodiment.

If the determination result of STEP S401 becomes "YES", in STEP S601 of FIG. 6A, the controller 201 performs a destination location table generating process. FIG. 7 is a flow chart illustrating a detailed example of the destination location table generating process of STEP S601 of FIG. 6A. With respect to a plurality of destination locations, the controller 201 has information on the latitudes, longitudes, and altitudes of the destination locations in advance. As described above, for example, with respect to imaging spots in a place (such as a tourist attraction), the controller may have information on the latitudes, longitudes, and altitudes of imaging locations where it is possible to cleanly image subjects in the imaging spots, as the destination location information. Under this condition, first, in STEP S701 of FIG. 7, based on the outputs of the GPS sensor and the pressure sensor included in the flight sensor 203 of FIG. 2, the controller 201 calculates the latitude, the longitude, and the altitude at that moment (the release time when it is determined in STEP S401 of FIG. 6A that the flight device has separated from the hand), as the initial location. Subsequently, in STEP S702 of FIG. 7, with respect to the plurality of destination locations, based on the latitudes, longitudes, and altitudes of the destination locations and the latitude, longitude, and altitude of the initial location acquired in STEP S701, the controller 201 calculates the horizontal angles θ, vertical angles φ, horizontal movement distances "D" of the destination locations 502 relative to the initial location 503 as shown in FIG. 5B. Subsequently, the controller 201 generates a destination location table containing destination location information items having the horizontal angles θ, vertical angles φ, and horizontal movement distances "D" calculated with respect to the destination locations, as parameters, in association with the plurality of destination locations, and stores the destination location table in a memory (not particularly shown) included in the controller 201.

Figure 8:
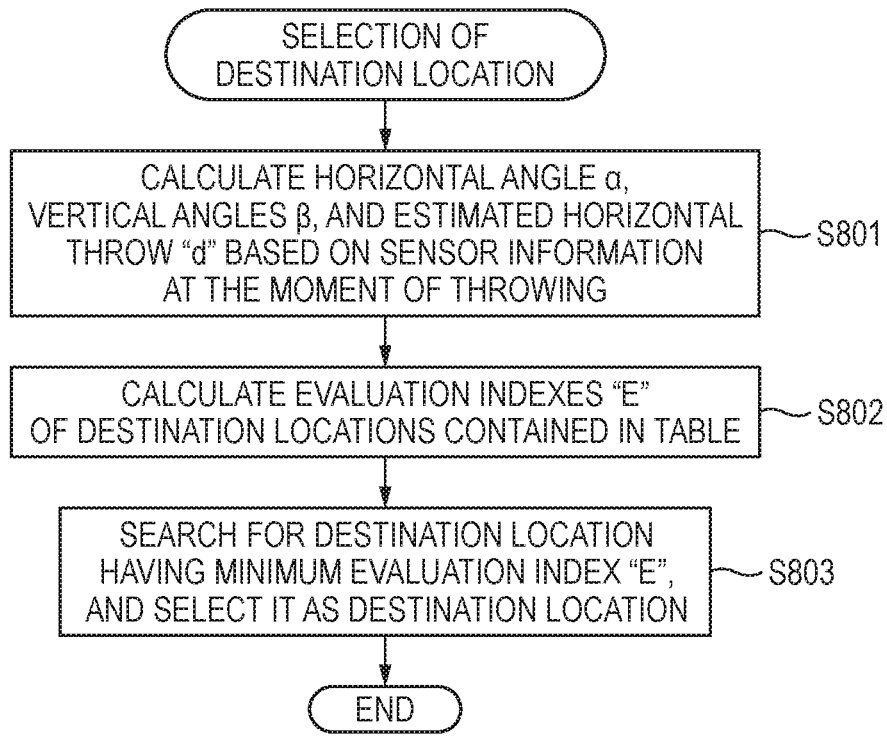
FIG. 8 is a flow chart illustrating a detailed example of a destination location selecting process according to the second embodiment.

Returning to FIG. 6A, in STEP S602 of FIG. 6A, the controller 201 performs a process of selecting a destination location according to the state at the moment of throwing, as the destination point, from the destination location table generated in STEP S601. FIG. 8 is a flow chart illustrating a detailed example of STEP S602. In FIG. 8, first, in STEP S801 of FIG. 8, the controller 201 calculates the horizontal angle α, the vertical angle β, and the estimated horizontal throw "d" at the moment of throwing as shown in FIG. 5A, by operations corresponding to Expressions 1, 2, 3, 5, 6, 9, and 10 described above. Subsequently, in STEP S802 of FIG. 8, the controller 201 calculates the error "E" between the horizontal angle α, the vertical angle β, and the estimated horizontal throw "d" at the moment of throwing, and the horizontal angle θi, the vertical angle φi, and the horizontal movement distance "Di" corresponding to each of the plurality of destination location information items contained in the destination location table generated in STEP S601, by an operation corresponding to Expression 11 described above. Next, in STEP S803 of FIG. 8, the controller 201 searches for a destination location information item having the minimum error "E", and selects the searched destination location information item, as the destination point.

Returning to FIG. 6A, after the process of STEP S602, in STEP S603 of FIG. 6A, the controller 201 determines a flight route based on the positional relation between the destination point and the current point. Specifically, the controller 201 controls the first to fourth motor drivers 205 of FIG. 2 such that the flight device flies at the horizontal angle θ and the vertical angle φ by the horizontal distance "D" according to the destination location information item selected in STEP S602.

Subsequently, in STEP S403 of FIG. 6A, similarly in the flow chart of FIG. 4 according to the first embodiment, the controller 201 performs a posture control operation such that the flight device becomes flyable. Then, in STEP S404, based on the output of the flight sensor 203, the controller determines whether the flight device is taking a flyable posture. If the determination result of STEP S404 is "NO", the controller repeats STEP S403.

If the determination result of STEP S404 becomes "YES", in STEP S604 of FIG. 6A, the controller 201 controls the first to fourth motor drivers 205 of FIG. 2 such that the flight device flies along the flight route determined in STEP S603, that is, the flight device flies at the horizontal angle θ and the vertical angle φ by the horizontal distance "D" according to the destination location information item selected in STEP S602. Specifically, the controller 201 has the initial location in advance, and controls the motor drivers 205 such that the current flight location relative to the initial location keeps the horizontal angle θ and the vertical angle φ.

Subsequently, in STEP S605 of FIG. 6A, the controller 201 determines whether the flight device has reached the destination point. Specifically, the controller 201 determines whether the horizontal distance of the current flight location from the initial location is the horizontal distance "D".

If the determination result of STEP S605 is "YES", the controller 201 performs the same processes as those of STEPS S407 to S413 of FIG. 4 according to the first embodiment.

In the first and second embodiments described above, the flight device is controlled such that it performs imaging while hovering. However, the flight device may perform imaging while staying there by hovering, or may perform imaging while flying.

The flight device 100 may show the imaging timing by an LED (a semiconductor LED), a liquid crystal display, or the like.

The number of still images which the flight device 100 takes is arbitrary.

The flight device 100 can acquire not only still images but also videos by imaging. In this case, the shooting times of videos are arbitrary.

The flight device 100 may transmit an acquired video, for example, to a terminal held by the thrower, by communication, such that the thrower can shoot while seeing the video.

The imaging location, imaging direction, imaging timing, and the like of imaging which is performed by the flight device 100 may be wirelessly operated, for example, from the terminal held by the thrower.

In a case of using a mechanism for folding the motor frames 102 to make the flight device 100 portable, a process of transforming the motor frames 102 into a flyable state may be performed immediately after throwing.

In the first and second embodiments, as examples of an information gathering device, the embodiments of the flight device 100 having the camera 106 as an information acquisition sensor unit have been described. However, the present invention is not limited thereto, and may be implemented as an information gathering device in which the information acquisition sensor unit is composed of sensors for gathering information on the distribution of temperature, and information on the distribution of atmospheric components.

Also, in the first and second embodiments, the example in which the propelling units include the motors 104 and the rotor blades 103 has been described. However, the propelling units may be implemented by a mechanism which is driven by air pressure or engine power.

Although some embodiments of the present invention have been described above, those embodiments are merely illustrative and do not limit the technical range of the present invention. The present invention can take other various embodiments, and various modifications such as omission and replacement can be made without departing the gist of the present invention. These embodiments and modifications are included in the scope and gist of the invention described in this specification and the like, and are included in the scope of the inventions disclosed in claims and their equivalents.

What is claimed is:

1. A flight device which has at least one propelling unit for flying in the air and which is throwable by a user, said flight device comprising:
a controller that drives the propelling unit after throwing is performed by the user, such that the flight device flies based on a state of the flight device at a moment when the throwing is performed;
a flight sensor that detects acceleration values; and
a touch detection sensor that detects a touch of the flight device by the user and a release of the flight device by the user;
wherein the controller calculates velocities of directions of individual coordinate axes of a predetermined absolute coordinate system at a moment after the throwing is performed, and calculates an initial velocity, a horizontal angle of the throwing on a coordinate plane parallel to the ground, and a vertical angle of the throwing on a coordinate plane perpendicular to the ground, based on the velocities of the directions of the individual coordinate axes; and
wherein the controller calculates the velocities of the directions of the individual coordinate axes at the moment when the throwing is performed, by integrating an acceleration value of the direction of each of coordinate axes output from the flight sensor, from a time when the acceleration value of the direction of the corresponding coordinate axis exceeds a predetermined threshold, to a time when the touch detection sensor detects that the flight device is released by the user based on the acceleration value of the direction of the corresponding coordinate axis.

2. The flight device according to claim 1, wherein:
the coordinate system is a three-dimensional coordinate system having an x axis, a y axis and a z axis each of which is perpendicular to one another; and
when the time when the acceleration value of the direction of each coordinate axis output from the flight sensor exceeds the predetermined threshold is ts, the time when the touch detection sensor unit detects that the flight device is released by the user is tr, the velocities of the directions of the individual coordinate axes are Vx, Vy, and Vz, and the acceleration values of the directions of the individual coordinate axes output from the flight sensor are ax, ay, and az, the controller calculates the velocities Vx, Vy, and Vz of the directions of the individual coordinate axes by operations equivalent to the following Expressions 12, 13, and 14:

$$V_x = \int_{t_s}^{t_r} a_x \Delta t,$$ [Expression 12]

$$V_y = \int_{t_s}^{t_r} a_y \Delta t, \text{ and}$$ [Expression 13]

$$V_z = \int_{t_s}^{t_r} a_z \Delta t.$$ [Expression 14]

3. The flight device according to claim 1, wherein:
the coordinate system is a three-dimensional coordinate system having an x axis, a y axis and a z axis each of which is perpendicular to one another;
when the horizontal angle is $\alpha$, and the vertical angle is $\beta$, the controller calculates the horizontal angle $\alpha$ by an operation equivalent to the following Expression 15:

$$\alpha = \tan^{-1}\left(\frac{V_z}{\sqrt{V_x^2 + V_y^2}}\right),$$ [Expression 15]

and
the controller calculates the vertical angle $\beta$ by an operation equivalent to the following Expression 16:

$$\beta = \tan^{-1}\left(\frac{V_y}{V_x}\right).$$ [Expression 16]

4. The flight device according to claim 3, wherein:
when the velocities of the directions of the individual coordinate axes are Vx, Vy, and Vz, and the initial velocity is Vini, the controller calculates the initial velocity Vini by an operation equivalent to the following Expression 17:

$$V_{ini} = \sqrt{V_x^2 + V_y^2 + V_z^2},$$ [Expression 17]

when a release time when the flight device is released by the user is tr, an elapsed time from the release time is t, a flight altitude and a horizontal flight distance from a location at the release time tr are H and L, respectively, the acceleration of gravity is g, and a throwing correction coefficient is K, the controller calculates the flight altitude H by an operation equivalent to the following Expression 18:

$$H = V_{ini} \times K \times \sin\beta \times t - \frac{1}{2} \times g \times t^2,$$ [Expression 18]

the controller calculates the horizontal flight distance L by an operation equivalent to the following Expression 19:

$$L = V_{ini} \times K \times \cos\beta \times t, \text{ and}$$ [Expression 19]

the controller drives the propelling unit such that, at the elapsed time t, the flight device is positioned at the altitude H calculated by the operation equivalent to Expression 18, and the horizontal flight distance L calculated by the operation equivalent to Expression 19, in the direction of the horizontal angle $\alpha$ calculated by the operation equivalent to Expression 15.

5. The flight device according to claim 3, further comprising:
a destination location table that contains a plurality of destination location information items determined by horizontal angles $\theta$ between an initial location and destination locations, vertical angles $\varphi$ between the initial location and the destination locations, and horizontal movement distances "D" from the initial location to the destination locations,
wherein, when the velocities of the directions of the individual coordinate axes are Vx, Vy, and Vz, and the initial velocity is Vini, the controller calculates the initial velocity Vini by an operation equivalent to the following Expression 20:

$$V_{ini} = \sqrt{V_x^2 + V_y^2},$$ [Expression 20]

when h is a coefficient, the controller calculates an estimated horizontal throw "d" by an operation equivalent to the following Expression 21:

$$d = h \times V_{ini},$$ [Expression 21]

the controller compares the horizontal angle α calculated by the operation equivalent to Expression 15, the vertical angle β calculated by the operation equivalent to Expression 16, and the estimated horizontal throw "d" calculated by the operation equivalent to Expression 20, with the horizontal angle θ, the vertical angle φ, and the horizontal movement distance "D" corresponding to each of the plurality of destination location information items contained in the destination location table, and selects a destination location information item closest to the horizontal angle α, the vertical angle β, and the estimated horizontal throw "d", as the destination point, from the plurality of destination location information items; and the controller drives the propelling unit such that the flight device flies at the horizontal angle θ and the vertical angle φ by the horizontal movement distance "D", according to the selected destination location information item.

6. The flight device according to claim 5, wherein:

when a circumference ratio is π, the horizontal angle, the vertical angle, and the horizontal movement distance corresponding to each destination location information item are θi, φi, and Di, respectively, weighting coefficients for the horizontal angle, the vertical angle, and the horizontal movement distance are "a", "b", and "c", respectively, and a maximum distance of the flight in the horizontal direction is Dmax, with respect to each of the plurality of destination location information items contained in the destination location table, the controller calculates an error "E" between the horizontal angle α, the vertical angle β, and the estimated horizontal throw "d", and the horizontal angle θi, the vertical angle φi, and the horizontal movement distance "Di" corresponding to the corresponding destination location information item, by an operation equivalent to the following Expression 22:

$$E = \sqrt{a\left(\frac{\alpha - \theta_i}{2\pi}\right)^2 + b\left(\frac{\beta - \varphi_i}{\pi}\right)^2 + c\left(\frac{d - D_i}{D_{max}}\right)^2},$$ [Expression 22]

and the controller selects a destination location having the minimum error "E" as the destination point.

7. The flight device according to claim 5, wherein:

the controller has information on latitude, longitude, and altitude of the corresponding destination location, with respect to each of the plurality of destination locations; and based on at least one of outputs of a GPS sensor and a pressure sensor at the release time when the flight device is released by the user, the controller acquires the latitude, the longitude, and the altitude at the release time, as the initial location;

with respect to each of the plurality of destination locations, based on the latitude, longitude, and altitude of the corresponding destination location and the latitude, longitude, and altitude of the initial location, the controller calculates the horizontal angle θ between the initial location and the corresponding destination location, the vertical angle φ between the initial location and the corresponding destination location, and the horizontal movement distance "D" from the initial location to the corresponding destination location; and the controller generates the destination location table containing the horizontal angles θ, the vertical angles φ, and the horizontal movement distances "D" calculated with respect to the plurality of destination locations, as parameters, in association with the destination locations.

8. The flight device according to claim 1, wherein:

the controller includes an estimating unit which estimates a destination point based on the state of the flight device at the moment after the throwing is performed by the user;

after the moment of throwing, the controller drives the propelling unit such that the flight device flies to the destination point estimated by the estimating unit.

9. The flight device according to claim 1, further comprising:

a digital camera unit, wherein the controller includes a trajectory calculating unit which calculates a trajectory based on the state of the flight device at the moment after the throwing is performed by the user;

wherein, after the flight device reaches a highest altitude point of the trajectory or reaches a destination point, the controller performs imaging by using the digital camera unit.

10. The flight device according to claim 1, wherein:

the propelling unit includes a plurality of motors and rotor blades configured to be rotated by the motors.

11. A flight method of a flight device which has at least one propelling unit for flying in the air and which is throwable by a user, said flight method comprising:

driving the propelling unit after throwing is performed by the user, such that the flight device flies based on a state of the flight device at a moment when the throwing is performed;

acquiring acceleration values output from a flight sensor; and detecting, by a touch detection sensor, a touch of the flight device by the user and a release of the flight device by the user, wherein the driving comprises calculating velocities of directions of individual coordinate axes of a predetermined absolute coordinate system at a moment after the throwing is performed, and calculating an initial velocity, a horizontal angle of the throwing on a coordinate plane parallel to the ground, and a vertical angle of the throwing on a coordinate plane perpendicular to the ground, based on the velocities of the directions of the individual coordinate axes, and wherein the calculating comprises calculating the velocities of the directions of the individual coordinate axes at the moment when the throwing is performed, by integrating an acceleration value of the direction of each of coordinate axes output from the flight sensor, from a time when the acceleration value of the direction of the corresponding coordinate axis exceeds a predetermined threshold, to a time when the touch detection sensor detects that the flight device is released by the user based on the acceleration value of the direction of the corresponding coordinate axis.

12. A non-transitory computer readable storage medium having a program stored thereon for controlling a flight device, which has at least one propelling unit for flying in the air and which is throwable by a user, to perform operations including:

driving the propelling unit after throwing is performed by the user, such that the flight device flies based on a state of the flight device at a moment when the throwing is performed;

acquiring acceleration values output from a flight sensor; and detecting, by a touch detection sensor, a touch of the flight device by the user and a release of the flight device by the user, wherein the driving comprises calculating velocities of directions of individual coordinate axes of a predetermined absolute coordinate system at a moment after the throwing is performed, and calculating an initial velocity, a horizontal angle of the throwing on a coordinate plane parallel to the ground, and a vertical angle of the throwing on a coordinate plane perpendicular to the ground, based on the velocities of the directions of the individual coordinate axes, and wherein the calculating comprises calculating the velocities of the directions of the individual coordinate axes at the moment when the throwing is performed, by integrating an acceleration value of the direction of each of coordinate axes output from the flight sensor, from a time when the acceleration value of the direction of the corresponding coordinate axis exceeds a predetermined threshold, to a time when the touch detection sensor detects that the flight device is released by the user based on the acceleration value of the direction of the corresponding coordinate axis.

* * * * *